United States Patent [19]

Margolis

[11] Patent Number: 4,881,016
[45] Date of Patent: Nov. 14, 1989

[54] ACTIVE SHADOW MASK COLOR CRT

[76] Inventor: Arthur A. Margolis, 1201 S. Ocean Dr., Apt. 2307N, Hollywood Beach, Fla. 33019

[21] Appl. No.: 282,322

[22] Filed: Dec. 9, 1988

[51] Int. Cl.$^4$ .................................. H01J 29/80
[52] U.S. Cl. ........................... 315/376; 358/66
[58] Field of Search ..................... 315/376; 358/66

[56] References Cited

U.S. PATENT DOCUMENTS 2,862,141 11/1958 Kruper et al. .................. 315/376
3,315,027 4/1967 Winge ............................ 358/66

Primary Examiner—Theodore M. Blum
Attorney, Agent, or Firm—Fleit, Jacobson, Cohn, Price, Holman & Stern

[57] ABSTRACT

In a color cathode ray tube, a single selectron beam is deflected through a deflection yoke and passes through a collimation lens to an active shadow mask formed with a plurality of apertures to divide the beam into a plurality of segments. Each beam segment is intensity modulated at the entrance of its aperture through modulating electrodes which focus the electrons in the beams at crossover points within the apertures. Lens electrodes at the exits of the apertures restore travel of the electrons to parallel paths approaching a three color phosphor screen. The distance between corresponding modulating and lens electrodes at the entrance and exit of each aperture is approximately equal to the sum of the focal lengths thereof for restoring said electron travel to the parallel paths and thereby correctively regulating display of multi-color information on the screen corresponding to the input modulating voltage signals applied to the modulating electrodes.

15 Claims, 4 Drawing Sheets

ACTIVE SHADOW MASK COLOR CRT

BACKGROUND OF THE INVENTION

This invention relates to single gun cathode ray tubes and, more particularly, apparatus for segmenting and modulating the electron beam of single gun cathode ray devices for multi-color image display purposes.

Color TV receivers presently include three electron beam guns to which positive going color video signals are applied at the resepective control grids thereof producing three separate color beams. Such arrangements are relatively expensive, involve complex circuitry to operate in a reliable manner and are difficult to adjust. Furthermore, the use of three electron beams reduces the available picture resolution since the three beams must converge at a passive aperture grid and pass through the same aperture. The resolution in the three gun cathode ray tube (CRT) is further degraded since modulation takes place before the beams are subjected to deflection and convergence during travel under magnetic influences. Furthermore, the three gun CRT experiences operational difficulties in moving vehicles as a result of the cutting of the earth's magnetic lines of force.

Accordingly, it is an object of the present invention to produce a TV display with superior resolution limited by the dimensions of apertures and companion phosphor dot or line target layouts for the electrons that exit the apertures and impinge on the phosphor layout.

SUMMARY OF THE INVENTION

In accordance with the present, a unique system for displaying information by means of a single electron beam is provided by dividing the beam into a plurality of beam segments, and at the same time modulating the beam segments with appropriate information from color video signals to display a color TV picture on a color TV screen. The single electron beam is emitted from an electron gun and swept periodically across a mask device formed with a plurality of parallel apertures extending perpendicular to an image plane in the direction of deflection. The beam is thereby divided into a number of segments. A modulating ring electrode at the entrance of each aperture is connected to a color video signal source established in the color TV receiver and controls the electron flow through the aperture. The electrons that flow through the aperture impinge on a phosphor target, lighting the impinged phosphor area by producing a dot of light. The intensity of each dot of light is proportional to the modulating signal on the corresponding modulating ring electrode. The color of each dot of light is dependent on the emission color of the phosphor.

One important use of the foregoing display system is for a color TV receiver having a single electron gun output. With the overall intensit of the single electron beam controlled by means of the cathode-control grid circuit of the single gun and, with the plurality of modulating electrodes connected for example in three groups, one to a red video input signal source, one to a blue video input signal source, and one to the green video input signal, and with the red phosphor being the target for the red apertures, the blue phosphor being the target for the blue apertures, and the green phosphor being the target for the green apertures, a color TV display will result in accordance with the beam deflection pattern, overall beam intensity, color signal information and the configuration of the three color hosphors on the screen.

According to one embodiment of the invention, the electron gun forms and projects an electron beam toward a tri-color phosphor screen. A set of horizontal and vertical deflection coils of a deflection yoke periodically deflects the beam in a direction transverse to its image plane. Before striking the screen, the beam is divided into a plurality of segments by striking a shadow mask. Some of the electrons in the beam form segments by passing through apertures in the mask. The remainder of the electrons bounce harmlessly off the shadow mask surface and are collected by the CRT anode. As the beam segments enter the apertures, the electrons pass through conductive modulating rings mounted on the shadow mask around each aperture entrance. Each beam segment is then individually modulated by a different color signal of well-known nature established in a conventional color TV receiver consisting of a red, blue or green video signal. The red video modulated beam segments then pass through their designated apertures and impinge on the red phosphor targets. The blue modulated segments impinge on the blue phosphor targets and the green modulated segments impinge on the green phosphor targets.

According to one feature of the invention, a collimation or beam deflecting lens is installed between the deflection yoke and the shadow mask structure. The lens has a converging focal length which is equal to its distance from the deflection center of the deflection yoke. The collimation lens thus forces the electrons in the beam to travel along parallel lines as they impact the shadow mask structure, regardless of the angle of deflection.

According to another feature of the invention, the intensity of each beam segment is modulated by a ring shaped modulating electrode at the perimeter of the entrance to the aperture through which the electron beam segment passes to reach its phosphor target. The electrode is maintained at a quiescent direct current voltage that is just strong enough to repel all or most of the incoming electrons. The incoming modulating signal is then directed to the electrode and is able to drive the electrode in a positive direction so that the amount of electrons that are permitted to pass the modulating electrode varies in proportion to the modulating signal voltage.

It can be shown that the ring like modulating electrode constitutes an electron lens which focuses the beam segment to a crossover point. After crossover, a second electrode is employed to rearrange the electron paths into parallel lines so as to terminate electron divergence and avoid electron collision with adjoining beam segments. The second electrode is installed at the perimeter of the exit of the aperture through which the electron beam segment must pass. The second exit electrode, like the modulation electrode at the aperture entrance, constitutes a electron lens. A predetermined voltage on the exit lens electrode is maintained such that the focal length of the entrance modulating electrode plus the focal length of the exit lens electrode is approximately equal to the distance between the entrance modulating and exit lens electrodes. Under these conditions, the electrons are redirected and will leave the aperture and exit lens electrode along approximately parallel lines.

The exit lens electrode can be maintained at a constant direct current voltage to achieve equality between (a) the sum of the focal lengths of the modulating and exit lens electrodes and (b) the spacing between such electrodes under an average modulating signal voltage. Alternatively, the modulating electrode may be coupled to the lens electrode so that the lens electrode voltage will follow the changing signal voltage of the modulating electrode.

BRIEF DESCRIPTION OF DRAWING FIGURES

Various objects and features of the invention will be better appreciated from a consideration of the following detailed description, taken in conjunction with the accompanying drawing in which.

DETAILED DESCRIPTION OF PREFERRED EMBODIMENT

Figure 1:
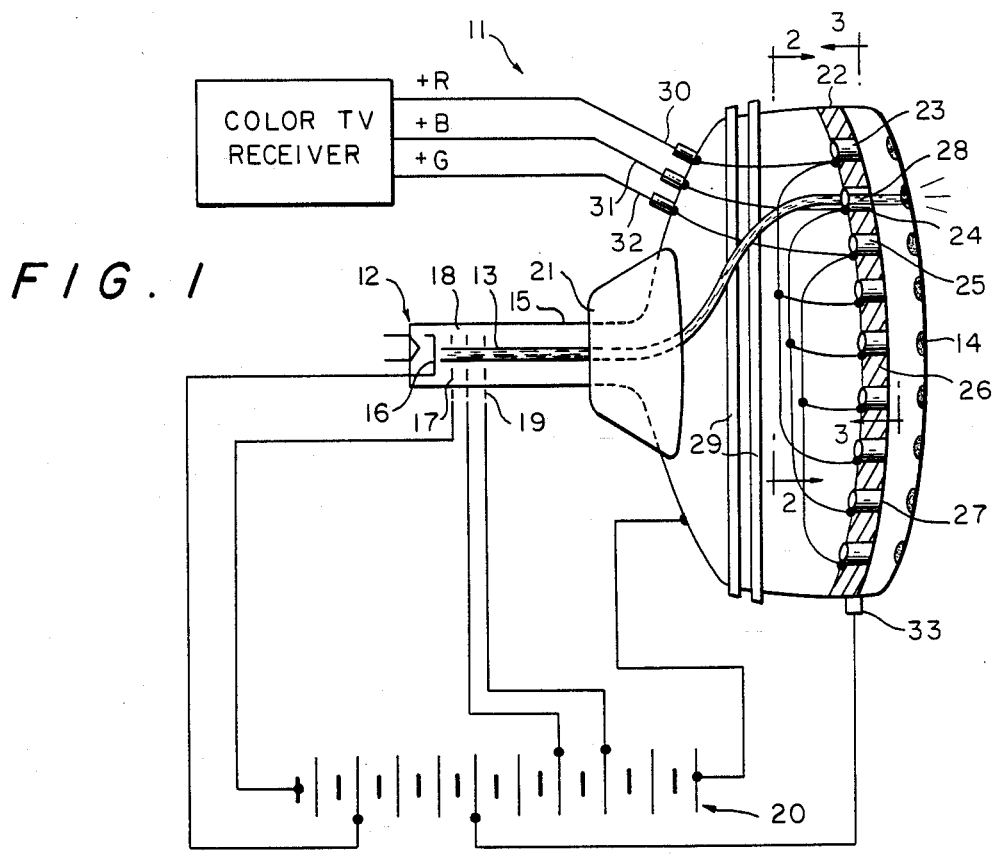
FIG. 1 is a sectional and schematic view of a single gun color cathode ray tube in accordance with the present invention.

Referring now to FIG. 1, a cathode ray rube 11 is shown having a single electron gun 12 for forming and projecting an electron beam 13 toward a three color phosphor screen 14 having a face portion on which phosphor material is deposited as shown. The beam is maintained within a vacuum by an envelope 15 which is typically made of glass. The electron gun comprises, by way of example, a cathode 16, a control electrode 17, an acceleration electrode 18 and a focusing element 19. These elements are connected in a known manner to a source of supply voltage 20. A pair of deflection coils associated with a deflection yoke 21 surrounds the neck section of the envelope to deflect the beam in a direction transverse to the image plane of the beam. The beam is made to scan a shadow mask 22 in conventional horizontal and vertical patterns.

The deflection coils of yoke 21 sweep the beam across the active shadow mask 22 which comprises a beam segmenting structure 26 with which three sets of modulating electrodes 23, 24 and 25 are associated together with a plurality of lens electrodes 27. The active shadow mask 22 is essentially a non-conductive shield having a plurality of apertures extending therethrough between an electron entrance on one side facing the gun 12 and an exit on the other side facing the phosphor screen 14. As the electron beam is made to sweep the structure of the shadow mask 22, those electrons that flow through an aperture define a beam segment 28. To compensate for differences of electron velocity direction due to deflection, a beam collimation lens formed by parallel spaced plates 29 as shown in FIG. 1 is installed between the deflection coils of the deflection yoke and the shadow mask. As will be explained hereinafter, the electrons after passing the collimation lens will travel in approximately parallel lines normal to the phosphor screen 14.

Figure 2:
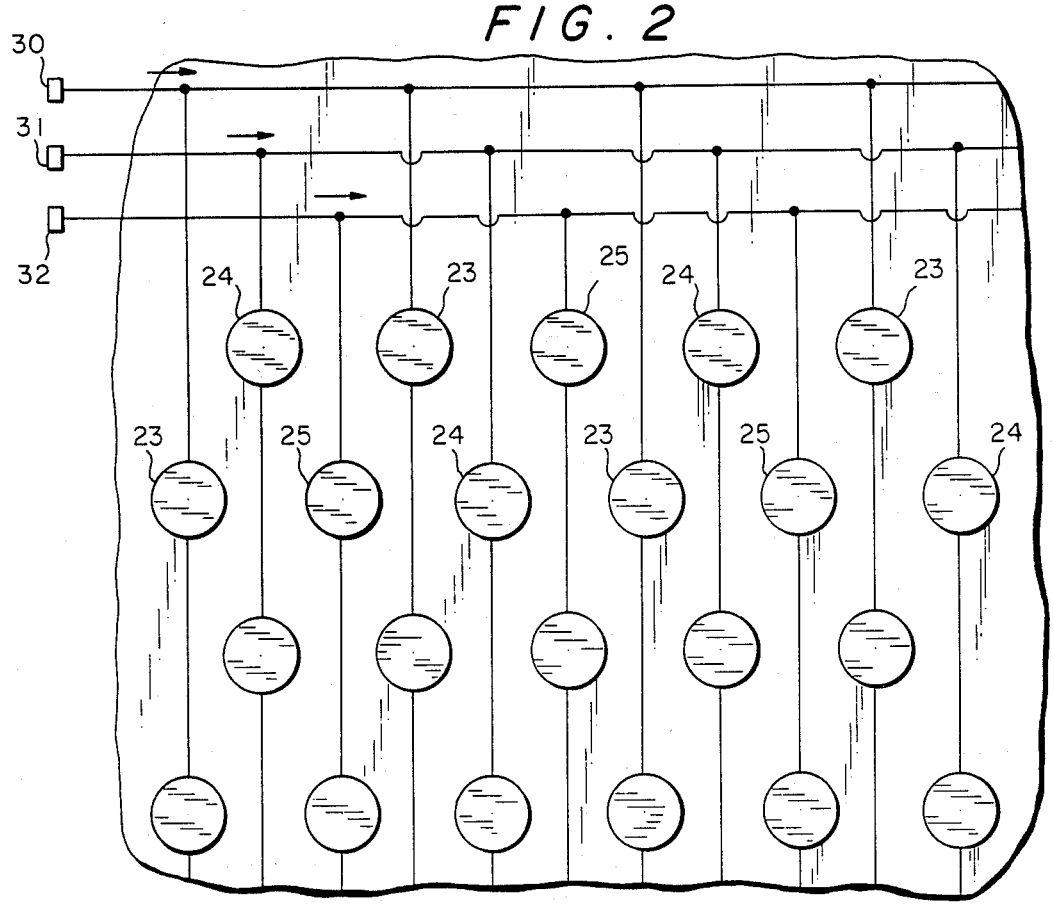
FIG. 2 is a schematic section view of the shadow mask of the cathode ray tube as seen from section line 2—2 in FIG. 1.

The quantity of electrons that actually impinge on the phosphor screen 14 is controlled by the modulating electrodes 23, 24 and 25. The modulating electrodes are arranged about the perimeter of the electron entrance of each aperture in the shadow mask, one modulating electrode for each aperture. As each beam segment 28 is formed, it passes through a ring like modulating electrode. The modulating electrodes are separated into three color groups as shown in FIG. 2. Each group has all of its assigned electrodes connected together. Each group is also connected to one of the three input color signal sources in a conventional color TV receiver 36 as hereinafter referred to. For example, all of the red signal modulating electrodes 23 are connected to the red signal input line 30, all of the blue electrodes 24 are connected to the blue input line 31 and all of the green electrodes 25 are connected to the green input signal line 32 by corresponding terminals as shown in FIG 1.

Figure 3:
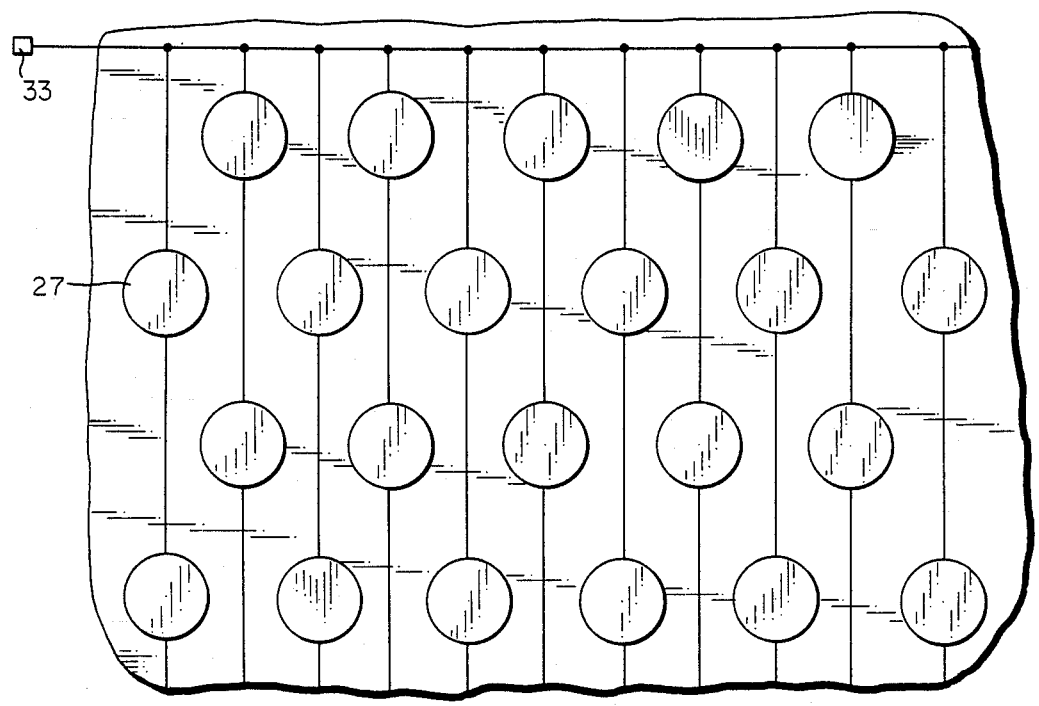
FIG. 3 is a schematic section view of the shadow mask as viewed from section line 3—3 in FIG. 1.

All of the modulating electrodes 23, 24 and 25 are maintained at a negative direct current voltage with respect to the cathode 16 of the electron gun. As a result, in the absence of an input signal, each electrode repels its beam segment and does not permit electrons to flow through the aperture to the phosphor screen 14. Upon application of an input signal, the modulating electrodes are driven to a more positive voltage which, in proportion to the amount of positive voltage, will allow electrons to enter the aperture and continue on to the phosphor screen to generate light at an intensity in accordance with the modulation effected. The lens electrodes 27 are all connected together as shown in FIG. 3.

Figure 4A:
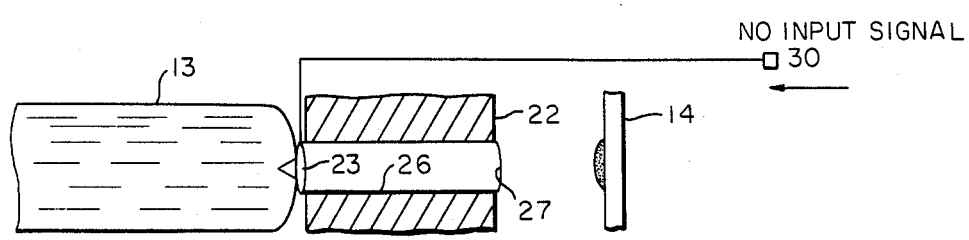
FIGS. 4A, 4B and 4C are enlarged partial section views of the cathode ray tube of FIG. 1 showing passage of beam segments therethrough.
Figure 4B:
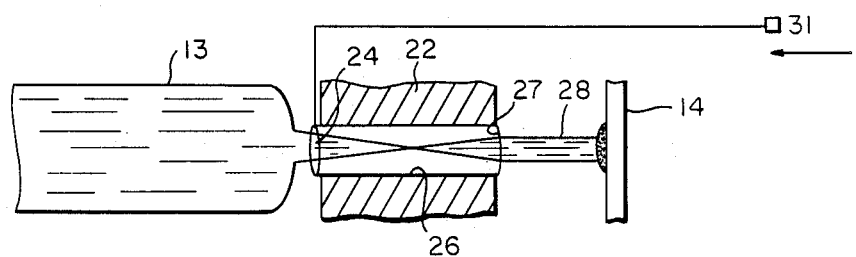
Figure 4C:
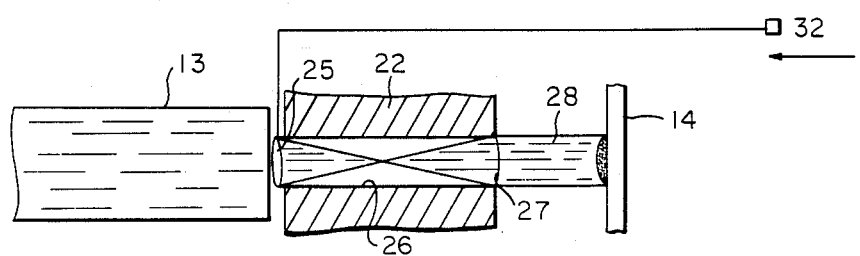

FIGS. 4A, 4B and 4C show electron beam segment paths through the apertures of the shadow mask structure 26. For example, on the red color input line 30, there is no input signal as shown in FIG. 4A. The modulating electrode 23 is therefore held at its most negative voltage. As a result, no electrons from beam 13 are permitted to enter the aperture. On the blue color input line 31 as shown in FIG. 4B, a small input signal is applied. This makes the voltage on the modulating electrode 24 somewhat more positive. As a result, a small amount of electrons are permitted to enter the aperture associated therewith. On the green color input line 32 as shown in FIG. 4C, a large input signal is applied. This makes the voltage on the modulating electrode 25 even more positive. As a result, a large amount of electrons are permitted to enter the aperture and be propelled to the phosphor screen 14. It can readily be seen that a beam segment is thereby effectively modulated in intensity by the modulating electrode it passes through to enter its aperture. The source of modulation signals and the source of deflection signals, the nature of which are already well known in the art, are conventional and are generated as a matter of course in modern color TV receivers such as the receiver 36 aforementioned.

Each ring shaped modulating electrode acts as an electron lens and tends to focus the beam segment which passes through the ring. The focal length of each modulating electrode becomes a function of the interaction of the voltage on the lens electrode 27 at the exit ends of the apertures, the voltage potential existing on the shadow mask 22 and the instantaneous voltage on the modulating electrode itself. As the electrons under the influence of the collimation lens 29 approach a modulation electrode in parallel lines, they will pass through the modulation electrode ring and then cross over at the focal point, a distance beyond the electrode in the aperture of the beam segmenting structure 26, as shown in FIGS. 4A, 4B and 4C. After the electron path cross over, the electrons will then diverge.

The purpose of the lens electrode 27 is to exercise control over the travel of the electrons at the point of cross over, reduce the divergence of such travel from the crossover point so as to cause the electrons to then proceed once more along parallel paths. To achieve such function, the lens electrode effectively converges and refocuses the beam to compensate for the divergence. It can be shown that if the distance between a modulating electrode and the lens electrode is equal to the sum of the focal length of the modulating electrode and the focal length of the lens electrode, the electrons will after cross over in the aperture of segmenting structure 26, change their divergent paths back to a path of parallel lines. Under such conditions, an electron beam segment will exit its aperture with the electrons in the beam traveling in substantially parallel paths to impinge on its phosphor target and produce an amount of light in proportion to the modulation signal.

The collimation lens 29 is important because the electrons will leave the lens electrodes in parallel lines only if they approach the modulating electrodes in parallel paths. The collimation lens 29 therefore forces the beam electrons to follow paths parallel to the CRT axis regardless of the deflection angle. The collimation lens performs such function when its focal length is equal to the distance therefrom to the center of deflection of the deflection yoke 21.

In summary, the electron beam passes through the influence of the collimation lens 29 so as to approach the active shadow mask 22 with its electrons traveling in parallel paths no matter what the deflection angle might be before the beam impacts the shadow mask. The beam is segmented as it passes through the apertures of structure 26. The modulation electrodes 23, 24 and 25 are maintained at a quiescent direct current voltage of −3 volts, for example. The lens electrode 27 is maintained, for example, at +600 volts. The phosphor screen 14 may be maintained at 15,000 volts. All of such voltages are maintained with respect to zero volts at the cathode 16 in the described embodiment.

It will be appreciated that a fair degree of design flexibility is inherent in the active shadow mask color CRT as hereinbefore described. For example, the exact electrode voltages and spacings that are most conveniently employed in a particular tube made in accordance with this invention, depend on the requirements that are to be met by such tube. The various electron paths that result from different designs are easily calculated from known principles of electron optics. Although the modulating electrodes and lens electrodes are shown as ring like, other structures are possible to perform the same functions. Numerous other modifications may be made by those skilled in the art without departing from the spirit and scope of the invention.

What is claimed as new is as follows:

1. In combination with a cathode ray display having an electron gun from which a single electron beam is emitted, a deflection yoke through which the electron beam passes, a phosphor display screen on which the electron beam impinges at locations under control of the deflection yoke and collimation lens means operatively positioned adjacent to the deflection yoke for maintaining travel of electrons in the electron beam along parallel paths approaching the display screen, a system for displaying multi-color image information on the display screen, comprising shadow mask means operatively positioned between the collimation lens means and the display screen for dividing said single electron beam into a plurality of color beam segments, modulating means operatively connected to the shadow mask means for respectively varying the color beam segments in intensity in accordance with different corresponding input signals and means operatively mounted on the shadow mask means for restoring the travel of the electrons along said parallel paths following displacement therefrom by operation of said modulating means.

2. The system as defined in claim 1 wherein said shadow mask means includes a beam segmenting structure formed with a plurality of apertures through which the respective color beam segments restrictively pass, each of said apertures having axially opposite entrance and exit ends.

3. The system as defined in claim 2 wherein said modulating means includes a plurality of modulating electrodes respectively mounted adjacent the entrance ends of the apertures, and means for applying modulating voltages to said modulating electrodes of varying intensity dependent on the corresponding input signals causing convergence of the color beam segments within the respective apertures at crossover points axially spaced from the respective modulating electrodes.

4. The system as defined in claim 3 wherein said restoring means includes a plurality of beam focusing electrodes respectively mounted adjacent the exit ends of the apertures and means for applying a control voltage to the beam focusing electrodes for regulating divergence of the color beam segments within the apertures from each of said crossover points axially spaced by focal lengths from the associated modulating and beam focusing electrodes, said modulating and beam focusing electrodes being axially spaced from each other by a predetermined distance approximately equal to the sum of said focal lengths, whereby the electrons in the color beam segments exiting from the exit ends of the apertures follow said parallel paths during approach to the display screen.

5. The system as defined in claim 2 wherein said restoring means includes a plurality of beam focusing electrodes respectively mounted adjacent the exit ends of the apertures and means for applying a control voltage to the focusing electrodes for regulating divergence of the color beam segments within the apertures from crossover points established therein by convergence of the color beam segments in response to said operation of the modulating means, whereby the electrons in the color beam segments exiting from the exit ends of the apertures follow said parallel paths during approach to the display screen.

6. In a cathode ray display device having a phosphor screen and means for generating a single beam of electrons traveling along parallel paths approaching the screen, the improvement comprising mask means for dividing said single beam into a plurality of beam segments, means for respectively modulating said beam segments in response to a plurality of input signals causing displacement of the electrons in the beam segments from the approaching parallel paths and beam focusing means mounted in operative relation to the mask means for restoring the travel of the electrons along the parallel paths during said approach to the screen.

7. The improvement as defined in claim 6 wherein said input signals correspond to multi-color information displayed on the phosphor screen.

8. The improvement as defined in claim 7 wherein said mask means includes a beam segmenting structure formed with a plurality of apertures through which the beam segments pass, respectively.

9. The improvement as defined in claim 8 wherein said beam modulating means includes a plurality of modulating electrodes respectivlly mounted in operative relation to the apertures and input signal responsive means connected to the modulating electrodes for applying modulating voltages thereto corresponding to the multi-color information displayed on the phosphor screen.

10. The improvement as defined in claim 9 wherein the beam focusing means includes a plurality of lens electrodes respectively mounted in operative relation to the apertures and control voltage means connected to the lens electrodes for regulating corrective restoration of the travel of the electrons in the beam segments along the parallel paths.

11. The improvement as defined in claim 6 wherein said mask means includes a beam segmenting structure formed with a plurality of apertures through which the beam segments pass, respectively.

12. The improvement as defined in claim 11 wherein said beam modulating means includes a plurality of modulating electrodes respectively mounted in operative relation to the apertures and input signal responsive means connected to the modulating electrodes for applying modulating voltages thereto corresponding to the multi-color information displayed on the phosphor screen.

13. The improvement as defined in claim 12 wherein the beam focusing means includes a plurality of lens electrodes respectively mounted in operative relation to the apertures and control voltage means connected to the lens electrodes for regulating corrective restoration of the travel of the electrons in the beam segments to the parallel paths.

14. The improvement as defined in claim 11 wherein the beam focusing means includes a plurality of lens electrodes respectively mounted in operative relation to the apertures and control voltage means connected to the lens electrodes for regulating corrective restoration of the travel of the electrons in the beam segments along the parallel paths.

15. In a color television receiver system including an image tube having at least one electron beam, an image display and a plurality of control electrode controlling intensity of electron flow to the image display responsive to each of a plurality of color signals, the improvement including means for applying the color signals to the control electrodes within the tube causing divergence of the electron flow from parallel paths, said image display including a mask portion having a plurality of spaced openings therein within the control electrodes are exposed and a screen on which discrete portions of material are deposited in aligned spaced relationship to the holes to emit light of respectively different colors and electrode lens means in the holes for restoring the divergent electron flow to the parallel paths approaching the screen.

* * * * *